March 17, 1931. C. M. GREEN 1,797,060
ELECTRICAL CONTROL SYSTEM AND PROTECTIVE DEVICE THEREFOR
Filed Dec. 5, 1928
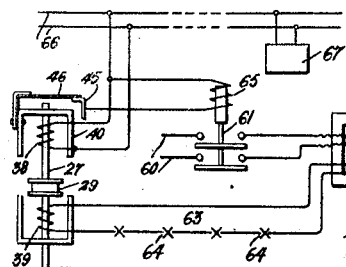
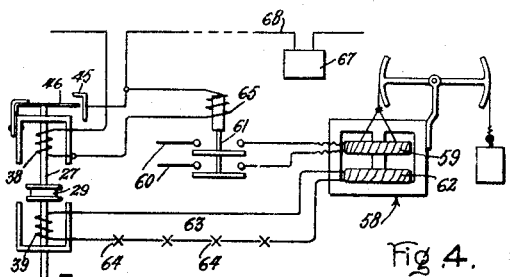
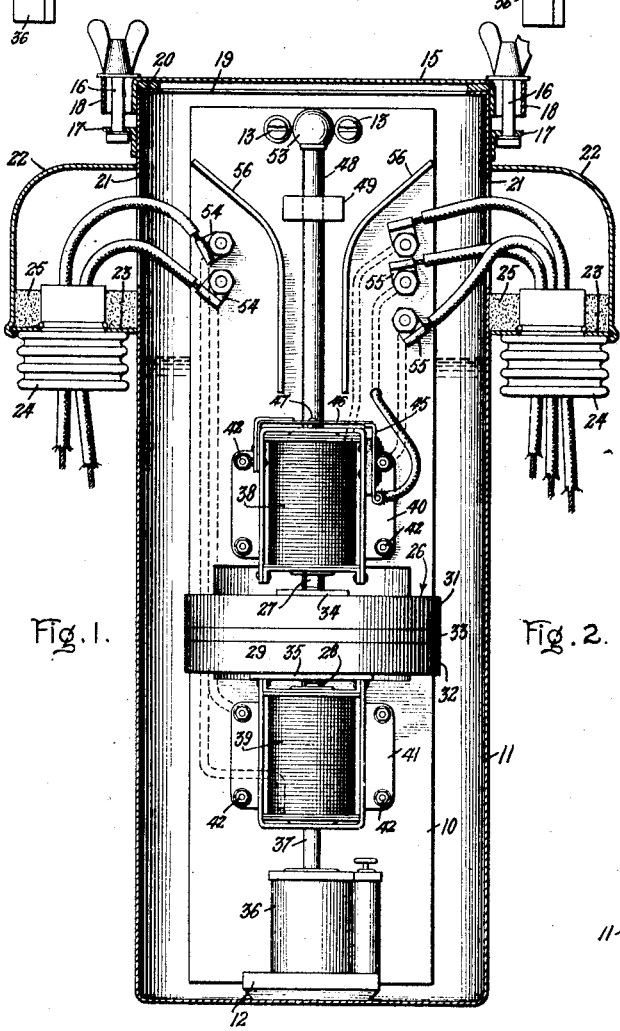
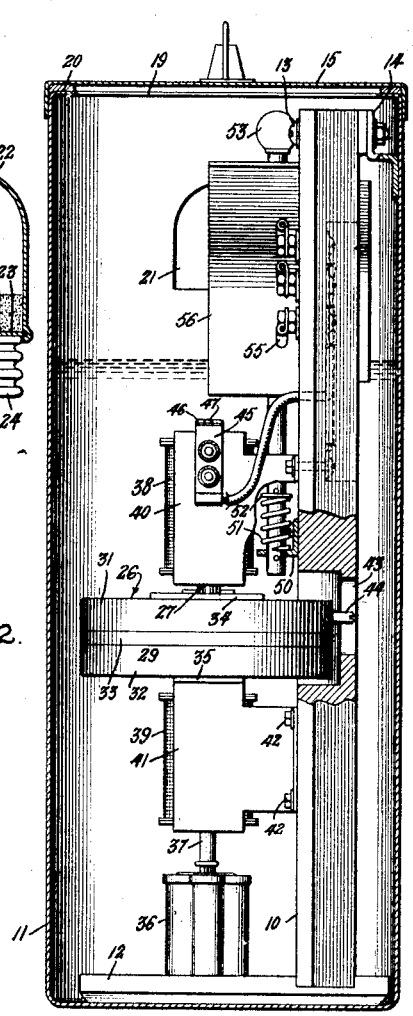
Inventor:
Charles M. Green,
by Charles E. Tullar
His Attorney.

Patented Mar. 17, 1931

1,797,060

UNITED STATES PATENT OFFICE

CHARLES M. GREEN, OF LYNN, MASSACHUSETTS, ASSIGNOR TO GENERAL ELECTRIC COMPANY, A CORPORATION OF NEW YORK

ELECTRICAL CONTROL SYSTEM AND PROTECTIVE DEVICE THEREFOR

Application filed December 5, 1928. Serial No. 323,910.

My invention relates to electrical control systems and protective devices therefor, particularly for high voltage service and the principal object of the invention is the provision of means for eliminating danger resulting from the breaking of a high voltage line.

In high voltage series street lighting systems it often happens that the circuits, particularly in outlying districts, are not of the highest class of construction and occasionally the high voltage lines will break and drop down upon the ground, thus constituting a source of danger both to life and property. These circuits ordinarily are supplied from the secondary of a constant current high voltage transformer, and should this secondary circuit be accidentally opened, for instance through a break in the street lighting line, the broken secondary circuit will remain energized as long as the primary of the transformer is energized, with obvious danger resulting.

In carrying out my invention in a high voltage, constant current, transformer street lighting system of the above character I have provided a protective device responsive to the opening of the secondary circuit for disconnecting the primary winding of the transformer from the source of electrical supply. It can thus be seen that, should a break occur in the line of the street lighting circuit, the primary winding of the transformer and consequently the lighting circuit will be deenergized, thus rendering harmless that portion of the line which may be near to or upon the ground.

For a better understanding of my invention, reference may be had to the accompanying drawing in which Fig. 1 is a front elevation, partly in section, of a protective device embodying one form of my invention; Fig. 2 is a side elevation, partly in section, of the device shown in Fig. 1; Fig. 3 is a diagrammatic view showing my protective device used in a multiple control circuit; while Fig. 4 is a diagrammatic view illustrating my protective device used in a series control circuit.

Referring to the drawing, in carrying out my invention in one form, I have mounted my protective device on a panel 10 of wood or other suitable insulating material, this panel being enclosed in a substantially liquid and air-tight, cylindrical receptacle or tank 11. The panel 10 is supported in a vertical position upon a bottom plate 12 preferably of the same material as the panel 10, the plate 12 resting in turn on the bottom wall of the tank 11. At its upper end the panel 10 is secured to the tank by means of bolts 13 and a bracket 14, the bracket being attached to the inside of the tank 11 by welding or other suitable means. A cover plate 15 is secured to the tank by means of wing bolts 16, 16 attached to external brackets 17, 17 and passing upwardly through ears 18, 18 secured to the periphery of the cover plate 15. The upper edge of the tank 11 is turned inwardly forming a rim 19 and a gasket 20 of felt or other suitable material is adapted to be compressed between the rim 19 and the inner surface of the cover plate 15. In order to provide for the attaching of connecting leads to my protective device, I have provided apertures 21, 21 in the side walls of the tank, these apertures being protected by guard members 22, 22 secured to the outside of the tank preferably by welding. The guard members 22, 22 substantially surround the apertures 21, 21 and are directed downwardly, the lower edges of the guard members being rolled outwardly to form supports for plates 23, 23 in which are mounted insulating bushings 24, 24. After the connecting leads have been passed through the bushings 24, 24, a suitable insulating compound 25 is placed around the upper portion of each bushing. It will thus be observed that I have provided a receptacle for my protective device which is substantially liquid and air-tight so that oil which normally fills the tank to a level just below the apertures 21, 21 will not leak out in case the tank should be moved from its vertical position.

In accordance with my invention I have provided a protective device mounted upon the panel 10, the protective device controlling the actuation of a switch in the primary circuit of a constant current transformer in response to a condition i. e. the opening, of the secondary or load circuit of the transformer. In one form, my protective device comprises a longitudinally movable armature 26 arranged to control the opening of a pair of contacts. The armature 26 consists essentially of a pair of elongated core members 27 and 28 secured at their inner or adjacent ends to a float member 29. Each of the members 27 and 28 consists of a plurality of strips, preferably of soft iron, which are secured together to form an elongated core adapted to be drawn into a magnet of the solenoid type. The float member 29 consists of a pair of wooden disks or plates 31 and 32 arranged at opposite sides of a disk 33 of a suitable insulating compound. The three disks 31, 32, and 33 are secured together by means of rivets, not shown. The core member 27 is attached at its lower end to a metallic plate 34 which is in turn attached to the upper side of the disk 31. Likewise, the upper end of the core member 28 is attached to a metallic plate 35 which in turn is secured to the under side of the disk 32. The purpose of the float member 29 comprising the disks 31, 32 and 33 is to retard the movement of the armature in a vertical direction, and in order to retard this movement still further, a dash pot 36 is arranged at the lower end of the armature, the piston of this dashpot being secured by means of a rod 37 of suitable non-magnetic material to the lower end of the armature member 28.

In order to actuate the armature in an upward direction a solenoid magnet 38 is provided, and a similar magnet 39 is provided to retain or hold the armature in a lower position. The solenoid magnets 38 and 39 are mounted in suitable supporting brackets 40 and 41, these brackets being attached to the panel 10 by means of bolts 42. In order to prevent any rotation of the float member 29 an aperture or slot 43 is provided in the panel 10, this slot serving to receive a projecting member 44 secured to the disk 31 of the float. It will be observed that when the magnet 38 alone is energized the core member 27 will be drawn within this magnet and thus the entire armature will be raised to its upper position, at which the float disk 31 abuts against the supporting bracket 40. When the lower magnet 39 is energized the core member 30 will be held within this magnet and the armature will maintain the position shown in Figs. 1 and 2, at which the float disk 32 abuts against the upper edge of the supporting bracket 41. When both magnets 38 and 39 are energized simultaneously, the forces thereof will be balanced and the armature will remain in the lower position, due to the effect of gravity. Since the tank 11 is to be filled with oil up to a level substantially even with the lower portions of the apertures 21, 21, the float member 29 acts as a time delay device to retard the movement of the armature. Also by adjusting the dashpot 36 the retarding action on the armature may be increased or decreased.

A pair of contacts 45 and 46 are secured to the upper portion of the supporting bracket 40, the contact 45 being fixed, while the contact 46 comprises a flexible metallic strip secured at one end to the bracket 40, the other end normally resting upon the fixed contact 45. A small contact button 47 of a suitable non-magnetic material is secured to the movable contact 46, this button being in registering relation with the upper end of the core member 27. When the armature is in its lower position, as shown in Figs. 1 and 2 of the drawing, the core member 27 will not engage the contact button 47 of the movable contact 46, but when the armature is in its upper position the core member 27 will engage the button 47 and thus lift the movable contact 46 away from the fixed contact 45, thus opening a circuit in which the contacts are connected.

In order to close the contacts 45 and 46 after they have once been opened due to the pull of the magnet 38, I have provided a push rod 48, vertically and movably supported in a guide member 49 and a bracket 50, the guide member and the bracket being suitably secured to the panel 10. In order to hold the push rod 48 in its normal or upper position, a compression spring 51 is provided surrounding the lower end of the push rod and abutting against the bracket 50 and a washer 52 secured to the push rod 48. A small knob or ball 53 of insulating material is secured to the extreme upper end of the push rod 48, this knob serving as a means for pressing the push rod downwardly. It will thus be seen that when the armature is in its upper position with the contacts 45 and 46 separated it is necessary only to remove the cover 15 of the tank 11 and to press the knob 53 of the push rod 48 downwardly to move the armature in a downward direction, thus allowing the contacts 45 and 46 to close.

Connecting lugs 54 and 55 are secured to the panel 10 by means of suitable bolts passing through the panel, and in order to insulate the lugs 54 which are connected to the magnet 39 from the lugs 55 connected to the magnet 38, I have provided a pair of strips 56 of suitable insulating material such as pressed paper, these strips being secured to the panel 10 along their edges, as is clearly shown in Figs. 1 and 2.

To illustrate the use of my protective device I have shown diagrammatically in Fig. 3 a street lighting system using a multiple pilot control. I have illustrated diagrammatically a constant current transformer 58 of a type such as is disclosed in U. S. Patent to Arnold No. 1,459,967 and assigned to the same assignee as this invention. The primary winding 59 of the transformer 58 is arranged to be connected to a source of constant electrical supply 60 through the magnetically operated double pole switch 61, while the secondary 62 of the transformer is connected directly to a load circuit 63 operating under a pressure of approximately 10,000 volts and comprising, for instance, a plurality of street lamps 64 connected in series. In order to energize the operating winding 65 of the switch 61 I have illustrated this winding as being connected in parallel in a multiple pilot control circuit 66. It is to be understood that the circuit 66 may serve to control one or a plurality of separate street lighting systems, another system of this type being illustrated diagrammatically by the reference character 67. When my protective device is to be used with the multiple control circuit illustrated in Fig. 3 the upper operating magnet 38 is connected in parallel with the control circuit 66. One end of the operating winding 65 is connected directly to one side of the control circuit 66, while the other end of the operating winding 65 is connected directly to the fixed contact 45. One end of the magnet coil 38 is attached directly to the supporting bracket 40, and thus it will be seen that in normal operation the operating winding 65 is connected in parallel with the control circuit 66, the current passing from the upper side of the control circuit 66 through the operating winding 65, fixed contact 45, movable contact 46, supporting bracket 40, to the lower side of the control circuit 66. The lower magnet 39 is connected directly in series with the transformer secondary winding 62 and the lamps 64.

In the operation of my device as illustrated in Fig. 3, let us assume that the control circuit 66 is not energized. In this condition the magnets 38 and 39 and the operating winding 65 will not be energized and the switch 61 will be in its open position as illustrated in the drawing. Since the magnets 38 and 39 are not energized the armature 26 will be in its lower position due to the effect of gravity and the contacts 45 and 46 will be closed. Now assuming that it is desired to light the lamps 64 in the series lighting circuit 63, the control circuit 66 and thus the operating winding 65, are energized, whereby the switch 61 is closed, allowing the primary winding 59 of the transformer 58 to be energized. Although the magnet 38 is also energized simultaneously with the operating winding 65 the delaying action of the float member and the dashpot 36 will prevent the upward movement of the armature 26 and the opening of contacts 45 and 46 until the secondary 62 of the transformer and the lighting circuit 63 have been energized. Simultaneously with the flow of current in the secondary winding 62 the magnet 39 will be energized and thus the armature 26 will be held in its lower position due to the balanced or equal action of the magnets 38 and 39. The series lighting circuit 63 is now connected for normal operation. Should, however the circuit 63 be opened such as through a break in the line connecting the lamps 64, the magnet 39 will instantly be deenergized; the armature 26 will rise due to the upward pulling action of the magnet 38; the armature portion 29 will engage the contact button 47, and the contact 46 will be moved away from the fixed contact 45. Concurrently therewith, the operating winding 65 will be deenergized and the switch 61 will open, thus removing the potential from the transformer 58 and the circuit 63. It will thus be seen that should a break occur in the lighting circuit 63 my protective device will immediately function to deenergize the transformer 58 and render harmless the broken portions of the circuit 63, which perhaps may have fallen on or near the ground.

In case it is desired to use my protective device with a series control circuit such as illustrated in Fig. 4, it is only necessary to reverse the position of the contacts 45 and 46 so that the movable contact member 46 will, in its normal position, be below the fixed contact member 45. This may be done by vertically adjusting the position of the fixed contact 45 so that it will be directly above and slightly separated from the end of the movable contact 46. In using my protective device with the series control circuit illustrated in Fig. 4, the magnet 38 and the operating winding 65 are connected in series with the circuit 68 which may be a series pilot control circuit or another lighting circuit. In this case one end of the operating winding 65 is connected to the fixed contact 45 while the other end is connected directly to the supporting bracket 40, and it will be observed that when the contacts 45 and 46 are closed the operating winding 65 will be short circuited, thus allowing the switch 61 to open the primary circuit of the transformer. The circuit in this case comprises the left side of the circuit 68, magnet 38, supporting bracket 40, and closed contacts 46 and 45 to the right hand side of the circuit 68. However, in normal operation the circuit comprises the left hand side of the circuit 68, magnet 38, and operating winding 65 to the right hand side of the control circuit 68. Assuming that the series lighting circuit 63 is in operation with the switch 61 closed and the armature 26 in its lower position, if the circuit 63 should be opened the magnet 39 will be deenergized, allowing the magnet 38 to pull the armature 26 upwardly, forcing the movable contact 46 against the fixed contact 45 thereby short-circuiting the operating winding 65 and removing the potential from the transformer 58 and the circuit 63 through the opening of the switch 61.

From the foregoing description, I believe it will be apparent that I have provided a protective device in which, under normal conditions the pulls exerted by the magnets 38 and 39 are balanced and the armature 26 is held in its lower position by gravity. The effect of gravity is, however, partially counterbalanced by the buoyant effect of the float 29 which is immersed in the oil. When the balance is destroyed, for instance by the opening of the load or lighting circuit 63. the pull of the upper magnet 38 lifts the armature 26, opening the multiple control circuit or short circuiting the magnet 65 in the series control circuit thereby opening the primary circuit of the transformer 58 followed by a drop to zero of the potential in the secondary winding.

While I have illustrated a constant current transformer I wish it understood that my invention is not limited to use of a transformer. For instance, a constant current reactance coil might be substituted for the transformer 58 with a proper change in connections without departing from the scope of my invention. My protective device may also be used with grounded or ground return series lighting circuits operated either from constant current transformers or reactance coils, as may be desired.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. In combination, a control circuit, a load circuit, means responsive to predetermined variations in the energization of said control circuit for controlling variations in the energization of said load circuit, and means responsive to a predetermined electrical condition in said load circuit for effecting operation of said first means to vary the energization of said load circuit independently of the control of said control circuit.

2. In combination, a control circuit, a load circuit, means responsive to predetermined variations in the energization of said control circuit for effecting corresponding variations in the energization of said load circuit, means cooperating with said first means tending to interrupt the action of said first means, and means responsive to a predetermined condition in said load circuit for normally preventing the operation of said second named means.

3. In combination, a control circuit, a load circuit, means responsive to predetermined variations in the energization of said control circuit for effecting corresponding variations in the energization of said load circuit, means cooperating with said first means tending to interrupt the action of said first means, and means associated with said second named means and with said load circuit for normally preventing the operation of said second means until the occurrence of a predetermined abnormal condition in said load circuit.

4. The combination with a transformer having a primary winding and a secondary winding, of a source of electrical supply for said primary winding, a load circuit connected to said secondary winding, a control circuit, means in said control circuit for controlling energization of said primary winding, means tending to interrupt the energization of said control means to open the circuit through the primary winding and means neutralizing the tendency of said second means but rendered ineffective upon a predetermined condition in said load circuit.

5. The combination with a transformer having primary and secondary windings, of a source of electrical supply for said primary winding, switching means for connecting and disconnecting said primary winding from said source of supply, means biasing said switching means to deenergize the primary winding, a load circuit connected to said secondary winding, a control circuit cooperating with said biasing means, and means for normally neutralizing the effect of said biasing means and responsive to a condition of said load circuit for removing said neutralizing effect.

6. The combination with a transformer having a primary and a secondary winding, of a source of electrical supply normally connected to said primary winding, means for disconnecting said primary winding from said source of supply, biasing means tending to actuate said means to disconnect said primary winding, a load circuit normally energized from said secondary winding, and means normally opposed to said biasing means to render the biasing means ineffective but responsive to the opening of said load circuit for causing said first mentioned means to respond to said biasing means to disconnect said primary winding from said source of supply.

7. In a control system, a transformer having primary and secondary windings, a source of electrical supply for said primary winding, a solenoid-operated switch for connecting said primary winding to said source of supply, a load circuit connected to said secondary winding, a control circuit cooperating with said solenoid-operated switch, and means in said control circuit biased to open said solenoid operated switch when said control circuit is energized and other means in said load circuit neutralizing said biasing means to keep said solenoid switch closed but responsive to the opening of said load circuit for permitting said biasing means to deenergize the solenoid of said switch to disconnect said primary winding from said source of supply.

8. The combination with a transformer having primary and secondary windings, of a source of electrical supply, magnetically operated switching means for connecting said primary winding to said source of supply, a control circuit cooperating with said switching means, a load circuit connected to said secondary winding, a longitudinally movable armature, an energizing winding surrounding one end of said armature and responsive to the flow of current in said load circuit, a second energizing winding surrounding the other end of said armature and responsive to the flow of current in said control circuit, and contact means actuated by movement of said armature for deenergizing said magnetically operated switching means in response to the opening of said load circuit so as to disconnect said primary winding from said source of supply.

9. The combination with a transformer having primary and secondary windings, of a source of electrical supply, a switch for connecting said primary winding to said source of supply, a control magnet for actuating said switch, normally closed contact means cooperating with said control magnet, a normally closed load circuit connected to said secondary winding, and means responsive to the opening of said load circuit for actuating said contact means so as to deenergize said control magnet and open said switch to disconnect said primary winding from said source of supply.

10. The combination with a transformer having primary and secondary windings, of a source of electrical supply, a switch for connecting said primary winding to said source of supply, a control circuit, a control magnet connected in said control circuit for actuating said switch, a normally closed load circuit connected to said secondary winding, a longitudinally movable armature, an energizing winding responsive to the flow of current in said load circuit for biasing said armature in one direction, a second energizing winding responsive to the flow of current in said control circuit for biasing said armature in another direction, and means responsive to movement of said armature in the latter direction for deenergizing said control magnet to disconnect said primary winding from said source of electrical supply.

11. In a street lighting system, a transformer having primary and secondary windings, a source of electrical supply, a switch for connecting said primary winding to said source of electrical supply, a control circuit, a control magnet responsive to a flow of current in said control circuit for actuating said switch to closed position, a series lighting circuit connected to said secondary winding, a longitudinally movable armature, means responsive to the flow of current in said series lighting circuit for biasing said armature in one direction, means for biasing said armature in the other direction, means responsive to movement of said armature in the latter direction for opening the circuit of said control magnet to open said switch, whereby said primary winding is disconnected from said source of electrical supply, and means for moving said armature in the first mentioned direction to reclose the circuit of said control magnet.

12. The combination with a transformer having primary and secondary windings, of a source of electrical supply, magnetically operated switching means for connecting said primary winding to said source of supply, a control circuit cooperating with said switching means, a load circuit connected to said secondary winding, a longitudinally movable armature, an energizing winding surrounding one end of said armature and responsive to the flow of current in said load circuit, a second energizing winding surrounding the other end of said armature and responsive to the flow of current in said control circuit, contact means actuated by movement of said armature for deenergizing said magnetically operated switching means in response to the opening of said load circuit so as to disconnect said primary winding from said source of supply, means for moving said armature in said first mentioned direction to actuate said contact means to reenergize said magnetically operated switching means, and means for delaying the movement of said armature.

In witness whereof, I have hereunto set my hand this third day of December, 1928.

CHARLES M. GREEN.